(12) United States Patent
Campos et al.

(10) Patent No.: US 11,114,069 B2
(45) Date of Patent: Sep. 7, 2021

(54) PRIVATE VIRTUALIZED DISPLAYS

(71) Applicant: HEWLETT-PACKARD DEVELOPMENT COMPANY, L.P., Spring, TX (US)

(72) Inventors: Mario E Campos, Houston, TX (US); Monji G Jabori, Houston, TX (US); Scott Rawlings, Fort Collins, CO (US); Thong Thai, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,305

(22) PCT Filed: Dec. 8, 2017

(86) PCT No.: PCT/US2017/065378
§ 371 (c)(1),
(2) Date: Jul. 26, 2019

(87) PCT Pub. No.: WO2019/112615
PCT Pub. Date: Jun. 13, 2019

(65) Prior Publication Data
US 2021/0134253 A1 May 6, 2021

(51) Int. Cl.
*G09G 5/14* (2006.01)
*G06F 21/10* (2013.01)
*G06F 3/14* (2006.01)
*G09G 5/42* (2006.01)
*G06T 1/20* (2006.01)
*G09G 5/391* (2006.01)

(52) U.S. Cl.
CPC ............ *G09G 5/42* (2013.01); *G06F 3/1431* (2013.01); *G06F 21/10* (2013.01); *G06T 1/20* (2013.01); *G09G 5/14* (2013.01); *G09G 5/391* (2013.01); *G09G 2310/08* (2013.01); *G09G 2340/145* (2013.01)

(58) Field of Classification Search
None
See application file for complete search history.

(56) References Cited

U.S. PATENT DOCUMENTS

| 7,136,042 B2 | 11/2006 | Magendanz et al. |
| 8,478,959 B1 * | 7/2013 | Wyatt ................. G06F 12/1475 711/163 |
| 8,538,741 B2 | 9/2013 | Jiang et al. |
| 8,810,601 B2 | 8/2014 | Klotzer |
| 9,489,165 B2 | 11/2016 | Wright et al. |
| 2003/0179154 A1 | 9/2003 | Demsky et al. |

(Continued)

*Primary Examiner* — Joni Hsu
(74) *Attorney, Agent, or Firm* — Brooks, Cameron & Huebsch LLC (57) ABSTRACT

In some examples, a non-transitory machine readable medium storing instructions executable by a processor to store display information in a private memory hidden from an operating system (OS), and divisibly virtualize a contiguous planar display into a first area as a main display and a second area as a second display separate from the main display, where the continuous planar display is divisibly virtualized responsive to exposure of the display information to the OS or the display information being directly provided to a graphics processing unit (GPU).

16 Claims, 6 Drawing Sheets

(56) References Cited

U.S. PATENT DOCUMENTS

| | | | |
|---|---|---|---|
| 2008/0205656 A1* | 8/2008 | Read | G06F 21/10 380/285 |
| 2009/0249235 A1* | 10/2009 | Kim | G06F 3/04886 715/765 |
| 2011/0144970 A1* | 6/2011 | Jiang | G06F 3/14 703/24 |
| 2011/0258348 A1* | 10/2011 | Wee | G06F 3/0227 710/14 |
| 2012/0214552 A1* | 8/2012 | Sirpal | G06F 3/0481 455/566 |
| 2012/0252536 A1* | 10/2012 | Noda | H04M 1/724 455/566 |
| 2014/0111699 A1* | 4/2014 | Kim | H04N 21/4222 348/734 |
| 2014/0157163 A1 | 6/2014 | Strutin-Belinoff et al. | |
| 2016/0104460 A1 | 4/2016 | Kiichle-Gross et al. | |
| 2018/0293183 A1* | 10/2018 | Cooray | G06F 13/16 |
| 2019/0045116 A1* | 2/2019 | Yamamoto | G09G 5/14 |
| 2019/0087200 A1* | 3/2019 | Bellanger | G06F 3/14 |

* cited by examiner

PRIVATE VIRTUALIZED DISPLAYS

BACKGROUND

Display devices include external display devices and internal display devices. For instance, external display devices may be employed with desktop computers while internal display devices may be disposed in notebook, tablet, and/or hybrid notebook computers, among other possibilities. The display devices may have various aspect ratios such as a 16:9 aspect ratio, among other aspect ratios.

DETAILED DESCRIPTION

As mentioned, some display devices may have various aspect ratios such as a 16:9 aspect ratio and/or a 16:10 aspect ratio, among other aspect ratios. While some aspect ratios such as 16:9 readily permit viewing of content they may not readily permit content creation or other activities. Some display devices may apportion a total area of a physical display into two separate areas such as a main display and a second display that having respective areas that together sum to the total area of the physical display. Having a main display and a second display can permit use to the main display and the second display but may not promote use of the total area of the display for a particular given activity (e.g., viewing content) in a widescreen aspect ratio such as 16:9 across a total width of the total area of the display.

Accordingly, the disclosure is directed to the selective exposure of a virtual displays. As detailed herein, private virtualized displays can permit selective exposure of display information stored in a private memory to an operating system (OS). In this manner, private virtualized displays can readily permit transition between an individual display and dual displays on a physical screen and yet securely store of the display information in the private memory. Private virtualized display can also directly provide display information stored in a private memory to a graphics processing unit (GPU) to securely provide dual displays on a physical screen and/or continue to provide content via a second display even when the OS experiences an issue in contrast to other approaches such as those that may expose two displays to an OS in all instances. Notably, in either case (display information exposed to the OS or not) private virtualized displays can divisibly virtualize a contiguous planar display into a first area as a main display and a second area as a second display separate from the main display, as described herein.

Figure 1:
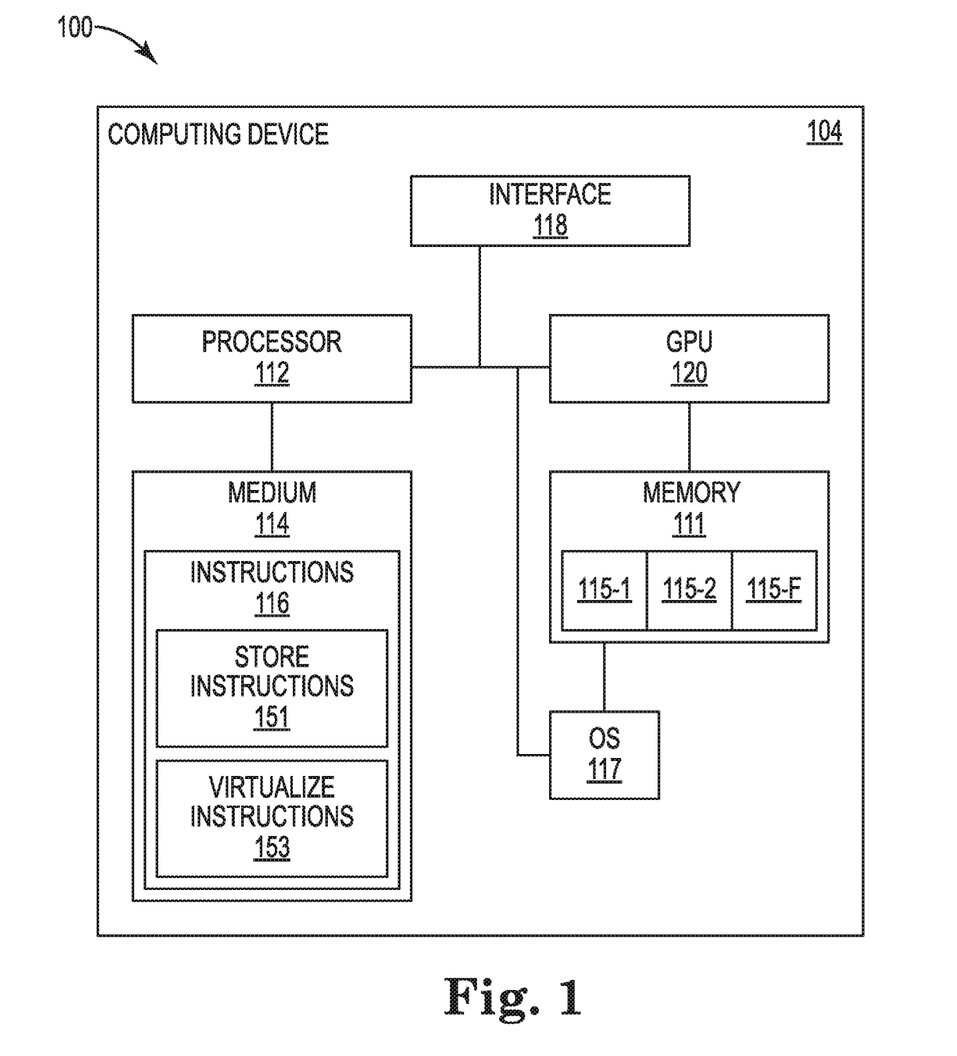
FIG. 1 illustrates a diagram of an example computing device including a display suitable for private virtualized displays.

FIG. 1 illustrates a diagram of an example computing device including a display suitable for private virtualized displays. As illustrated in FIG. 1 the computing device 104 can include a processor 112, a machine-readable medium 114 including instructions 116 executable by the hardware processor, a memory 111 including a public memory represented as public frame buffer 115-1 and a private memory represented as private frame buffers 115-2 and 115-F, and an OS 117. While FIG. 1 illustrates a given number of frame buffers it is understood that at total number of frame buffers can be increased or decreased as can a given number of frame buffers in the private memory and/or in the public memory.

The memory 111 can be a Random-Access Memory (RAM), an Electrically-Erasable Programmable Read-Only Memory (EEPROM), a storage drive, an optical disc, and the like. The memory can be included in various components of the computing device 104. For instance, memory can be included coupled to processor 312 and/or coupled to the GPU, among other possibilities. As mentioned, the memory 111 can include a public memory represented as public frame buffer 115-1 and a private memory represented as private frame buffers 115-2 and 115-F. As used herein, the term "private" when referring to a private memory, a private random-access memory, or a private frame buffer refers to a memory/frame buffer that can be hidden from an OS. As used herein, the term "public" (i.e., non-private) when referring to public memory, a public random-access memory, or a public frame buffer refers to a memory/frame buffer that is exposed to the OS (and not hidden from the OS even when hidden mode is active).

The public frame buffer 115-1 refers to a frame buffer that is exposed to the OS 117. As used herein, a memory such as the public frame buffer and/or a private frame buffer being "exposed" to the OS refers to the OS being able to read and/or write to the memory. Conversely, as used herein when a private memory such as the private frame buffer 115-2 and/or the private frame buffer 115-F is "hidden" from the OS that refers to the OS being unable to read from and unable to write to the memory. Frame buffers can refer to RAM. For instance, private frame buffer 115-2 and/or the private frame buffer 115-F can form a private RAM while public frame buffer 115-1 can form a public RAM.

In some examples, exposing the OS can include providing an OS API to access the private memory such as frame buffer 115-2. It is noted that while the OS may access the private memory the OS itself can hide the private memory from another application, in some examples. Conversely, in some examples, hiding the private memory such as frame buffer 115-2 can include removal or not providing an OS API. Stated differently, when the frame buffer 115-2 is hidden the computing device 104 is without an OS API and instead employs a Video Driver/Graphics Driver API to read/write to the frame buffer 115-2.

The non-transitory machine readable medium 114 can be any electronic, magnetic, optical, or other physical storage device that stores executable instructions. Thus, non-transitory machine readable medium 114 can be, for example, Random Access Memory (RAM), an Electrically-Erasable Programmable Read-Only Memory (EEPROM), a storage drive, an optical disc, and the like. While illustrated as separate and distinct from the memory 111 in some examples the memory 111 and the medium 114 can be combined. The executable instructions 116 can be "installed" on the computing device 104 and/or can be downloaded to a computing device. Non-transitory machine readable medium 114 can be a portable, external or remote storage medium, for example, that allows the computing device 104 to download the instructions 116 from the portable/external/remote storage medium. In this situation, the executable instructions can be part of an "installation package". As described herein, non-transitory machine readable medium 114 can be encoded with executable instructions 116 related to private virtualized displays.

An interface such as the second interface 118 can be a physical interface, at which the computing device 104 can provide display and/or video signals to a display device, as described herein. When the computing device 104 is separate from the display device 102, the physical interfaces can include HDMI, the DisplayPort interface, and DVI. When the computing device 104 is integrated with the display device 102 as an individual computer, the physical interfaces can be proprietary ribbon cable connectors and other types of interfaces, which can be HDMI, DisplayPort interface, or DV standards but with non-standard physical form factors, among other possibilities. The processor 112 and/or the GPU (i.e., GPU hardware) 120, if present, provide the display and/or video signals on the second interface 118.

The processor 112, a machine-readable medium 114 including instructions 116 executable by the hardware processor, a memory 111 including a public memory represented as public frame buffer 115-1 and a private memory represented as private frame buffers 115-2 and 115-F. The OS 117 and/or the GPU 120 can cause the computing device 104 to perform a variety of functions including those associated with private virtual displays, as described herein.

Figure 2:
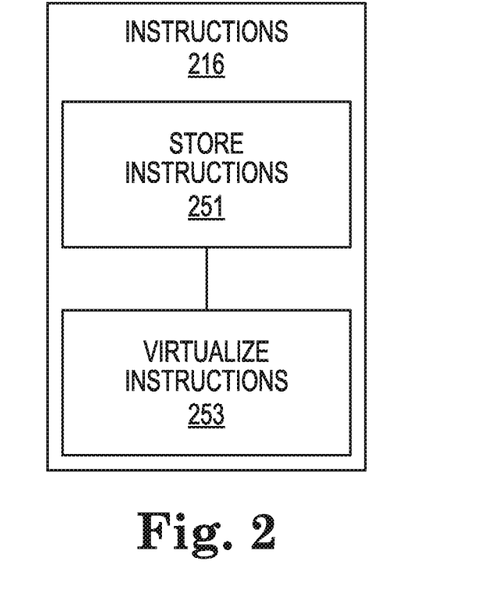
FIG. 2 illustrates a diagram of an example non-transitory machine-readable medium suitable for private virtualized displays utilizing a display.

FIG. 2 illustrates a diagram of an example non-transitory machine-readable medium 216 suitable for private virtualized displays utilizing a display. Non-transitory machine readable medium 216 can be encoded with executable instructions such as store instructions 251 and virtualize instructions 253 related to private virtualized displays.

In various examples, the store instructions 251 can store display information in a private memory hidden from an OS and/or in a public memory. Examples of display information includes information specifying a resolution (e.g., 16:9) and/or a display size of a display such as a main display and/or a second display, as detailed herein. For instance, in some examples, the store instructions 251 can store display information including a resolution and/or a display size of a second display in public memory and/or private memory.

Similarly, in some examples the store instructions 251 can include instructions to store display content in a private memory and/or in a public memory. The display content can include frames of variable data rate video among other possible types of display content capable of being displayed, for instance via a display device as described herein.

The virtualize instructions 253 can divisibly virtualize a contiguous display. For instance, as detailed herein with respect to FIGS. 4-6, the virtualize instructions 253 can divisibly virtualize into a first area as a main display and a second area as a second display separate from the main display. For example, the virtualize instructions 253 can divisibly virtualize a contiguous display based on the display information and/or display content stored by store instructions 251. For instance, in some examples the virtualize instructions 253 can expose display content to the OS when selectively exposing the display information to the OS or provide the display content directly to the GPU when directly providing the display information to the GPU.

In various examples, the virtualize instructions 253 can divisibly virtualize a contiguous display into a first area as a main display and a second area as a second display separate from the main display responsive to exposure of the display information to the OS or the display information being directly provided to a GPU. For instance, in some examples the virtualize instructions 253 can expose the display information to the OS when a hidden mode is inactive and/or can directly provide the display information to the GPU when a hidden mode is active.

As used herein, directly providing the display information to the GPU refers to providing the display information to the GPU without exposing the display information to the OS. Similarly, directly providing the display content to the GPU refers to providing the display content to the GPU without exposing the display content to the OS. That is, it is understood that in various examples display information and/or display content can be provided directly to the GPU such is when an original equipment manufacturer (OEM), the basic input/output system (BIOS) of the computing device, and/or other non-OS entity controls a second display instead of an OS controlling the second display. In such examples, content can be displayed via the second display even when the OS is experiencing issues. For example, the second display can notify a user that the OS is experiencing issues among other possibilities.

As used herein, the hidden mode refers to a mode that when inactivate exposes a private memory to the OS and when active keeps the private memory hidden from the OS. For instance, the private memory can be hidden from the OS by removing access of the OS to read and/or write to the private memory, among other possibilities. Alternatively, the private memory can be exposed to the OS by granting the OS read and/or write capabilities to the private memory. When exposed, the private memory can have information copied/mapped to the private memory from another memory. For instance, a GPU can copy/map display content to the exposed private memory (e.g., frame buffer 315-2 as illustrated in FIG. 3) from another frame buffer (e.g., frame buffer 315-F as illustrated in FIG. 3).

As detailed herein, hidden mode can be activated and/or inactivated responsive to an input. The input can be provided via a user interface of the display, a physical switch, and/or as the launch of an application executing on the system, among other possibilities.

Figure 3:
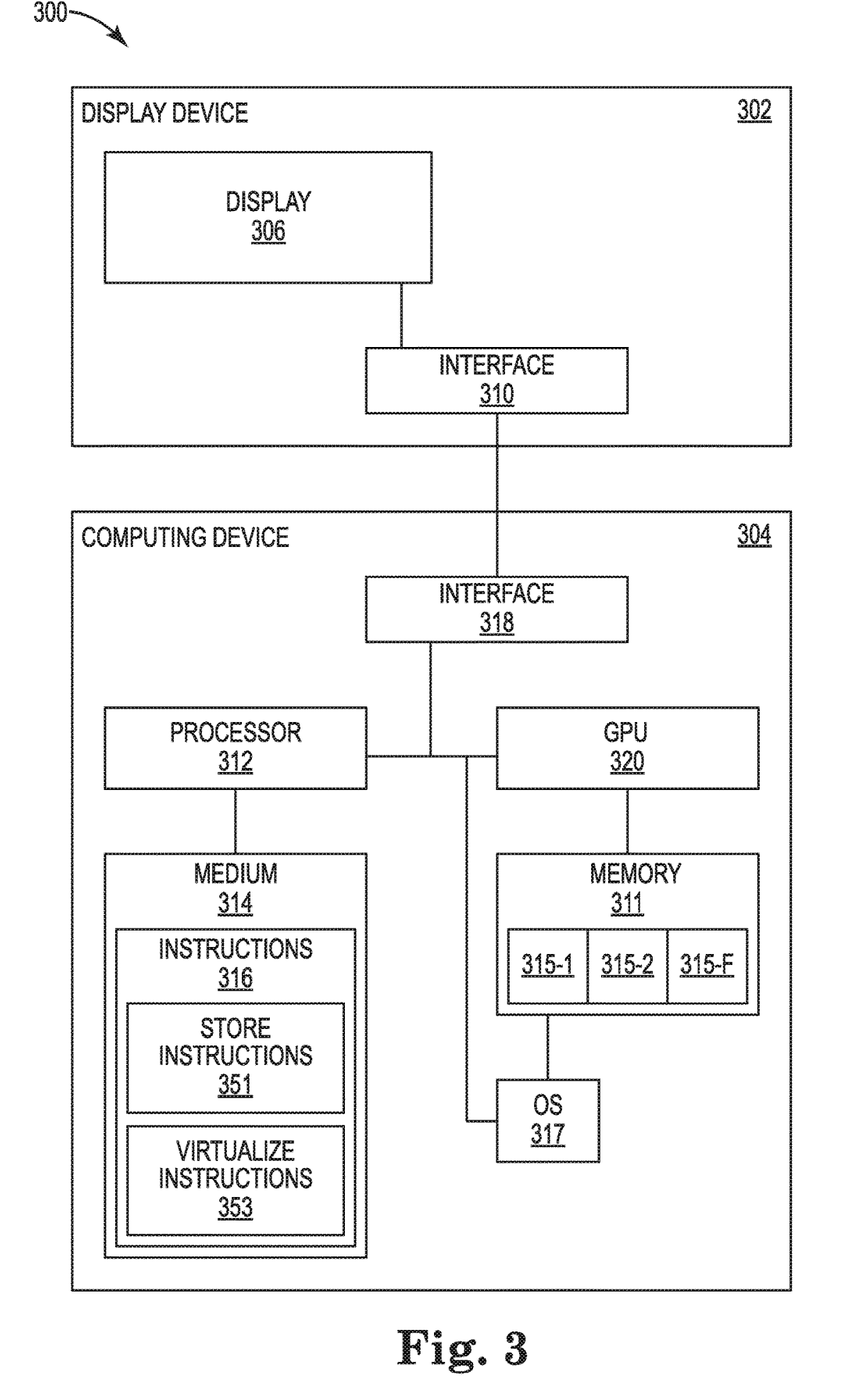
FIG. 3 illustrates a diagram of an example system including a display suitable for private virtualized displays.

FIG. 3 illustrates a diagram of an example system including a display suitable for private virtualized displays. As illustrated in FIG. 3, the system can include a display device 302 and a computing device 304.

The computing device 304 can be a mobile phone, a wearable electronic device, a tablet, a laptop computer, a desktop computer, or combinations thereof. In some examples, the computing device 304 can be an all-in-one (AIO) computer. As used herein, an AIO computer refers to a computer which integrate the internal components into the same case as the display, offer the touch input functionality of the tablet devices while also providing the processing power and viewing area of desktop computing systems.

The display device 302 can include a display 306 and a first interface 310. The display device 302 can be an external display device for the computing device 304, or can be integrated with the computing device 304. For instance, in some examples, the display device 302 can be an external monitor for a desktop computer.

The display 306 can be a contiguous planar display 306. The display 306 can be planar in that the surface of the display 306 is and is used as an individual plane, as opposed to multiple planes that are parallel or non-parallel to each other. The display 306 can be contiguous in that portions, sections, or areas of the display 306 abut one another without separation. For instance, the right-most pixels of a first portion of the display 306 can be immediately adjacent to the left-most pixels of a second portion of the display 106 to the immediate right of the first portion at the same distance at which the second-to-right most pixels of the first portion are adjacent to the right-most pixels of the first portion.

The display 306 can be a physical display panel, such as liquid crystal display (LCD) display panel, organic light-emitting diode (OLED) display panel, microscopic LED (mLED, microLED, or micro-LED) display panels, quantum dot LED (QLED) display panel, and other types of flat and/or curved display panels. The display 306 can be a touchscreen display, such as a touch-sensitive display have multi-touch capability. A multi-touch display is able to register and detect the locations of multiple touches on the display by a user. A touchscreen display can be employed with a stylus, for more precise usage of the display by a user as compared to the user using his or her fingers to touch the display. The display 306 can have integrated sensory haptic technology as well. The display 306 can further have adaptive sync technology that eliminates screen tearing.

As detailed herein, the display 306 is operable in a dual screen mode in which the planar display has a first area and a second area that is coplanar with the first area. The first area functions as a main display, whereas the second area, which can be smaller than the first area, functions as a second display separate from the main display. For instance, the first area can have a 3:2 aspect ratio, whereas the second area can have a 5:18 aspect ratio, among other possibilities.

The first interface 310 can include a physical interface, at which the display hardware, as described herein, of the display device 302 receives display and/or video signals from the computing device 304. When the display device 302 is an external monitor for a separate computing device 304, such physical interfaces can include the high-definition multimedia interface (HDMI), the DisplayPort digital display interface, the digital video interface (DVI), among other interfaces. When the display device 302 is integrated with the computing device 304, such physical interfaces can be proprietary ribbon cable connectors and other types of interfaces, which can still adhere to HDMI, DisplayPort interface, or DVI standards but with non-standard physical form factors, among other possibilities.

In some examples, the display device 302 can include display hardware (not illustrated). The display hardware can include scaler hardware, timing controller hardware, and/or other types of controller hardware to control the display 306 in accordance with video or display signals received at the first interface 310. Scaler hardware, for instance, can convert video signals from a given display resolution to another resolution, such as the native resolution of the display 306. Timing controller hardware can generate the timing of video signals, such as the horizontal and vertical synchronization signals, and the blanking interval signals that are employed to facilitate the generation of images displayed on the display 306.

The computing device 304 can include a processor 312, a machine-readable medium 314 including instructions 316 executable by the processor, a memory 311 including a public memory represented as public frame buffer 315-1 and a private memory represented as private frame buffers 315-2 and 315-F and an OS 317, as described herein, among other components. For instance, in various examples, the computing device 304 can include GPU 320, The GPU 320 can assist the processor 312 or can independently rapidly manipulating and altering memory to accelerate the creation of images in a frame buffer for output to the display device 302 via a second interface 318. In this respect, the GPU 320 can be considered a special-purpose processor that can perform specialized processing for which the GPU 320 is specifically designed. For instance, the GPU 320 can have parallel structures that makes the GPU 320 particularly efficient relative to a CPU/typical processor for processing sizable blocks of display content such as video and/or audio data in parallel.

In some examples, system 300 further comprises dedicated switch such as a physical switch that is selectable to activate or inactivate hidden mode. The switch can be a dedicated physical switch (i.e., a button) on external portion of the computing device 304 and/or on an external portion of the display device 302. For instance, the dedicated physical switch can be a capacitive button and/or an analogue button located on an external portion of the computing devices 304 and/or the display device 302. As such, the switch can be readily accessible to an end user of the computing device 304 and/or the display device 302 to activate/inactivate hidden mode (e.g., responsive to actuation of the switch). In some examples the switch can be a capacitive switch such as those include in a touch screen or other display of the display device 302 and/or the computing device 304. In some examples, the switch can be a key included on a keyboard or combination of keys (a shortcut) included on a keyboard or other input device (mouse) of the computing device 304, Regardless, a 'dedicated' switch refers to a switch having a capability to cause activation and/or inactivation of hidden mode responsive to actuation of the switch. However, the disclosure is not so limited. Rather in some examples, launch or other action of an application executing on the system 300 can cause activation and/or inactivation of hidden mode. Similarly, dual display mode can be activated or inactivated by a dedicated switch that can be the same or different than the dedicated switch that activates/inactivates hidden mode.

Figure 4:
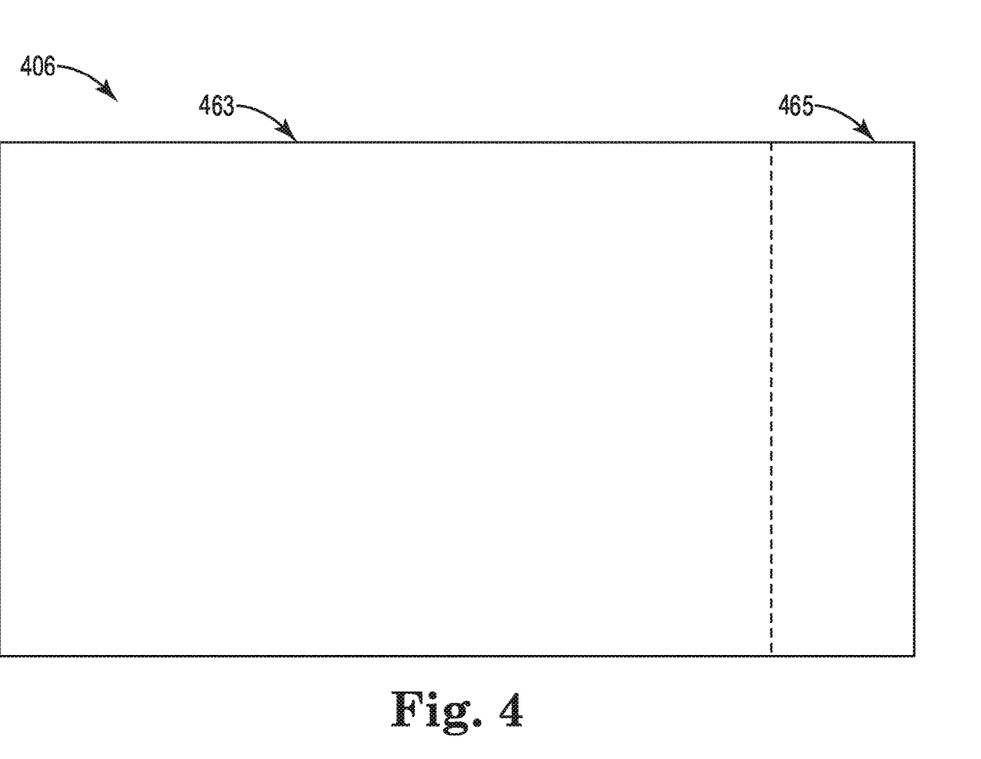
FIG. 4 illustrates a diagram of an example contiguous planar display of a display device suitable for private virtualized displays.

FIG. 4 illustrates a diagram of an example contiguous planar display of a display device suitable for private virtualized displays. As illustrated in FIG. 4, the display 406 can have a widescreen form factor with a 16:9 aspect ratio. In this dual display mode, the display 406 can have a first area 463 and a second area 465. The first area 463 can function as a main display and the second area 465 can function as a second display separate from the main display of the first area 463. The first area 463 having the main display can have a 3:2 aspect ratio, whereas the second area 465 having the separate, second display can have a 5:18 aspect ratio, among other possible aspect ratios.

As illustrated in FIG. 4, the contiguous planar display 406 is operating in landscape mode, and the second area 465 is to the right of the first area 463, although other relative positions including those described herein are possible. For example, a left-handed user can use a stylus in his or her left hand in the first area 463, and use the fingers of his or her right hand in the second area 465. However, the second area 465 can be user-selected to instead be to the left of the first area 463 in this dual display mode of the display device.

The contiguous planar display 406 can, in some examples, operate in portrait mode, in which the display 406 is operated vertically instead of horizontally. For example, if the display device is integrated with the computing device as a tablet computer or a convertible or hybrid notebook computer currently being operated as a tablet computer, the user can simply rotate the computer to operate the display 406 in portrait mode instead of in landscape mode. In portrait mode, the second area 465 having the separate, second display can be below and/or above the first area 463 having the main display, as orientated by a user.

Figure 5:
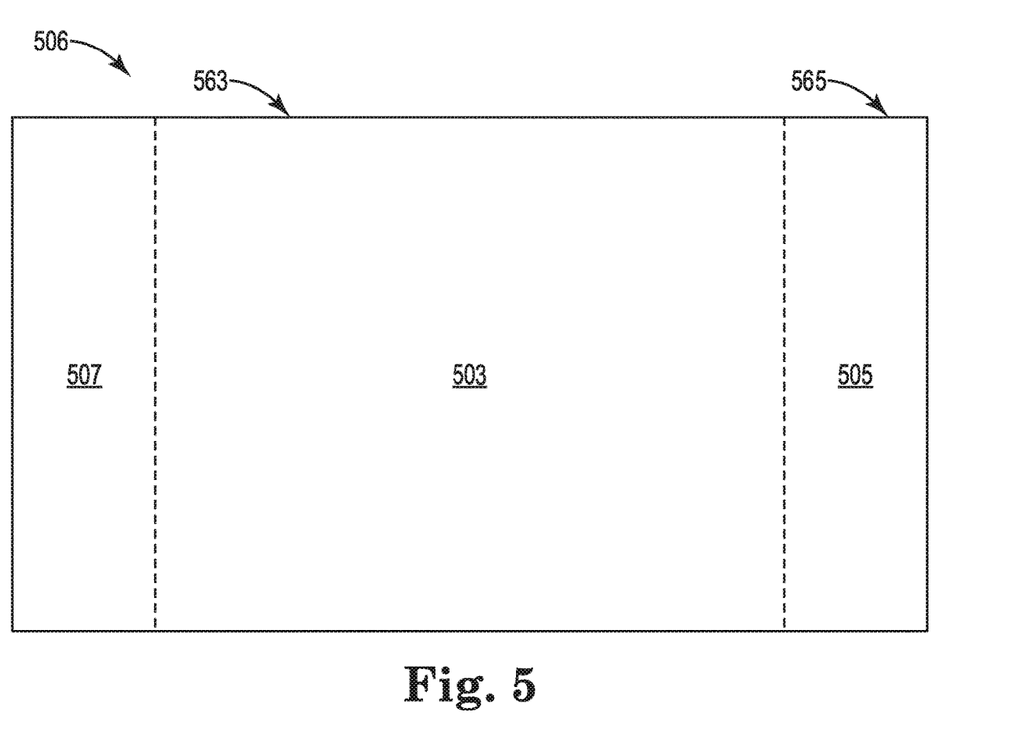
FIG. 5 illustrates a diagram of another example contiguous planar display of a display device suitable for private virtualized displays.

FIG. 5 illustrates a diagram of another example contiguous planar display of a display device suitable for private virtualized displays. As illustrated in FIG. 5 the display 506 includes three separate physical displays 503, 505, and 507. That is, in some examples, the display can be comprised of a plurality of physical displays including more or less physical displays than illustrated in FIG. 5. Each separate display 503, 505, and 507 can be a separate LCD, OLED, or other type of display panel. As illustrated in FIG. 5, the middle display 503 can be larger than each of the displays 505 and 507, which can be equal in size or have different sizes.

To achieve the display illustrated in FIG. 5, display hardware (as described herein) can expose at the interface in the display device one contiguous subset of the displays 503, 505, and 507 as the main display and another contiguous subset of the displays 503, 505, 507 as the separate, second display of the second area when display information is exposed to the OS. The computing device sees the display device as two separate physical displays as the form of the main display of the first area 563 and the second display of the second area 565 even though there are more than two such physical displays.

For example, if the second area 565 is to the right of the first area 563 then the displays 507 and 503 can be exposed as an individual main display, and the display 505 can be exposed as an individual and separate second display, as illustrated in FIG. 5. By comparison, if the second area is arranged by the user to be to the left of the first area, then the displays 503 and 505 are exposed as the individual main display, and the display 507 can be exposed as an individual and separate second display. Therefore, in this implementation, there are multiple actual physical displays that constitute the display 506 and the display hardware of the display device exposed two different subsets of these physical displays to the computing device at the interface of the display device as the main display of the first area 563 and as the second display of the second area 565. While various displays are described as being exposed herein, it is understood that in some examples the second display can be provided based on display information/display content provided directly to GPU and not exposed to an operating system. In the case in which there are three physical displays 503, 505, and 507 implementing the display 506, the subset exposed as the individual main display can include the middle display 503 and one or both of the displays 505 and 507. The subset exposed as the individual and separate second display can include the smaller display 505 or 507 that is not part of the subset exposed as the individual main display.

However, regardless of implementation, the computing device connected to the display device can operate the display device in this dual display mode by using the first area 563 of the planar display 506 as a main area and by using the second area 565 of the planar display 506 as a second area. The main and second areas are isolated from one another. This means that GUI elements, such as windows, controls, buttons, dialog boxes, and so on, cannot bleed over or be moved from the main area to the second area and vice-versa. This can also mean that the main area displays a GUI that is distinct and different from a GUI that the second area displays. Thus, various display content such as display content provided by an OEM can be displayed in the second area but is not displayed in the first area, in some examples. This type of display by be sought after particularly when the OS is experiencing issues as the GPU can continue to display content such as OEM content in the second area and/or BIOS content when the display content/display information is hidden from an OS but visible to the GPU, as described herein.

Figure 6:
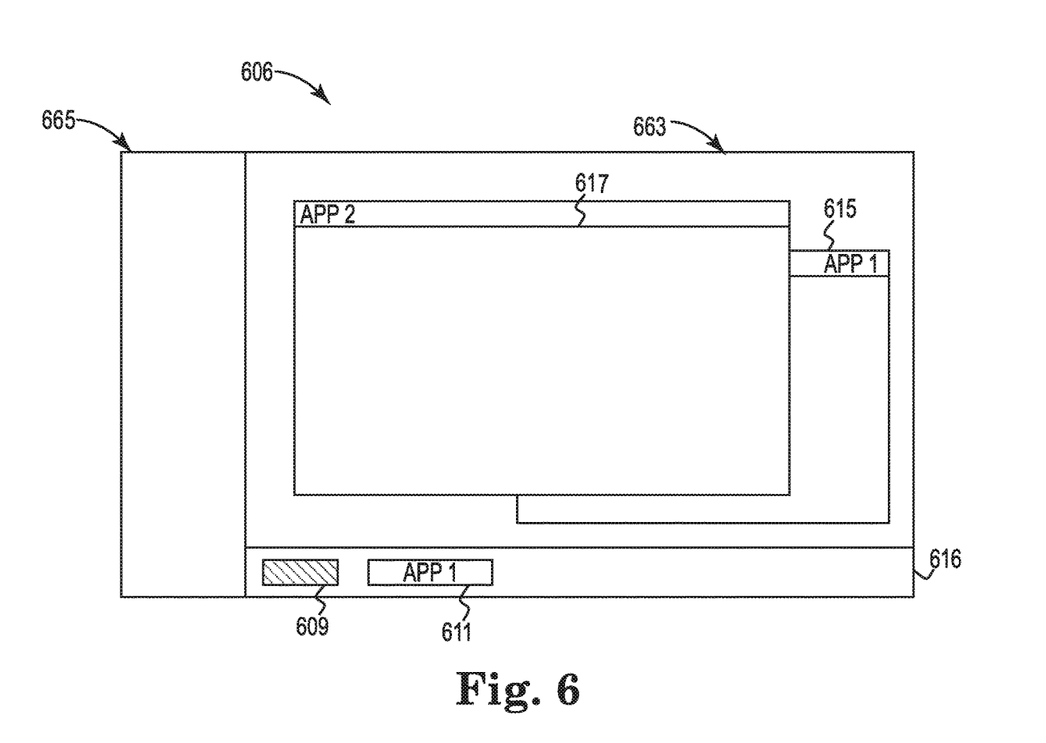
FIG. 6 illustrates a diagram of yet another example contiguous planar display of a display device suitable for private virtualized displays.

FIG. 6 illustrates a diagram of yet another example contiguous planar display 606 of a display device suitable for private virtualized displays. As illustrated in FIG. 6, in the main area 663, an OS running on the computing device can expose GUI elements such as a taskbar 616. The taskbar 616 can include a start or main button 609 that selection of which calls up a main program selection menu proffered through the OS. The taskbar 616 can include buttons or icons 611 corresponding to actively running application programs on the computing device via the OS. In the main area 663, the OS can display GUI elements such as windows 615, 617 for the actively running application programs. The application program having the window 617 currently has focus since it is the top-most window. This can mean that user input via a keyboard, for instance, is directed to this application program.

In some example, when in the dual display mode, second GUI is to display a plurality of operable GUI controls particular to an application that currently has focus in the main GUI and that running on the computing device. However, the present disclosure is not so limited. Rather, in some examples, the second GUI is to display content such as content and/or controls from an OEM that control aspects other than those related to a particular application that currently has focus in the main GUI and that is running on the computing device. For instance, the second GUI can display content and/or controls that related to system operation (e.g., operation of setting of the computing device) of the computing device, among other possibilities.

The GUI elements of the main area 663 cannot be moved onto, over, or into the second area 665, and further are not extendible into the second area, because the second area 665 is isolated from the main area 665. Such isolation occurs at the OS level and can further include operation of the second display in a hidden mode. While FIG. 6 illustrates a display 606 in dual display mode, in some examples, an entire area or width (e.g., in a 16:9 aspect ratio) of the planar display 606 can be used as the main area when dual display mode is inactive.

It will be understood that when an element is referred to as being "on," "connected to", "coupled to", or "coupled with" another element, it can be directly on, connected, or coupled with the other element or intervening elements can be present. In the foregoing detailed description of the disclosure, reference is made to the accompanying drawings that form a part hereof, and in which is shown by way of illustration how examples of the disclosure may be practiced. The figures herein follow a numbering convention in which the first digit corresponds to the drawing figure number and the remaining digits identify an element or component in the drawing. For example, reference numeral 116 may refer to element 104 in FIG. 1 and an analogous element may be identified by reference numeral 304 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

What is claimed:

1. A non-transitory machine readable medium storing instructions executable by a processor to:
 store display information in a private physical memory hidden from an operating system (OS); and
 divisibly virtualize a contiguous planar display into a first area as a main display and a second area as a second display separate from the main display, wherein the continuous planar display is divisibly virtualized responsive to:
  exposure of the display information in the private physical memory to the OS; or
  the display information being directly provided from the private physical memory to a graphics processing unit (GPU).

2. The medium of claim 1, wherein the display information includes a resolution or a display size of the second display.

3. The medium of claim 1, including instructions to expose display content to the OS when selectively exposing the display information to the OS or provide the display content directly to the GPU when directly providing the display information to the GPU.

4. The medium of claim 3, wherein the display content includes frames of variable data rate video.

5. The medium of claim 3, wherein the display content is displayed in the second area but is not displayed in the first area.

6. The medium of claim 1, further comprising instructions to expose the display information to the OS when a hidden mode is inactive.

7. The medium of claim 1, further comprising instructions to directly provide the display information from the private physical memory to the GPU when a hidden mode is active.

8. A system, comprising:
 a display device having a contiguous planar display and a first interface;
 a computing device having a second interface to couple with the first interface of the display device, the computing device including an operating system (OS), a private random-access memory (RAM) hidden from the OS, and a processor, the processor to:
  store display information in the private RAM; and
  divisibly virtualize the contiguous planar display into a first area of the planar display as a main area and a second area isolated from the main area, wherein the continuous planar display is divisibly virtualized responsive to both an input to activate dual display mode and:
   exposure of the display information in the private RAM to the OS; or
   the display information being directly provided to a graphics processing unit (GPU).

9. The system of claim 8, further comprising an individual physical display implementing the contiguous planar display.

10. The system of claim 8, including a scaler or timing controller hardware in the display device to expose the contiguous planar display to the OS as a main GUI and a second GUI when the display information is exposed to the OS.

11. The system of claim 8, further comprising instructions to receive the input via a user interface of the contiguous planar display, activation of a physical switch, or launch of an application executing on the system.

12. The system of claim 8, wherein in the dual display mode, the system is to display in the second GUI a plurality of operable GUI controls particular to an application that currently has focus in the main GUI and that running on the computing device.

13. The system of claim 8, further comprising instructions to use the entire area of the planar display as the main area when dual display mode is inactive.

14. A computing device comprising:
 a graphics processing unit (GPU);
 an interface to couple to a display device having a contiguous planar display
 a physical memory including a private frame buffer and a public frame buffer; and
 processor to:
  store display information in the private frame buffer; and
  responsive to an input to activate dual display mode:
   divisibly virtualize the contiguous planar display into a first area of the planar display as a main area and a second area isolated from the main area, wherein the continuous planar display is divisibly virtualized responsive to:
    selective exposure of the display information in the private frame buffer to the OS when hidden mode is inactive; or
    the display information being directly provided from the private frame buffer to the GPU when hidden mode is active.

15. The computing device of claim 14, wherein the computing device further comprises a dedicated switch selectable to activate or inactivate the hidden mode.

16. The computing device of claim 15, wherein the physical memory is a random-access memory (RAM).

* * * * *